(12) United States Patent
Carpenter et al.

(10) Patent No.: US 9,651,373 B1
(45) Date of Patent: May 16, 2017

(54) GRAVITY-BASED ANGLE SENSOR WITH LED INDICATOR

(71) Applicants: Don Carpenter, Urbana, OH (US); Don David Carpenter, Urbana, OH (US); Kirk Knoblauch, Wilmington, OH (US); Caleb Lusk, St. Paris, OH (US); Matthew Keller, Urbana, OH (US)

(72) Inventors: Don Carpenter, Urbana, OH (US); Don David Carpenter, Urbana, OH (US); Kirk Knoblauch, Wilmington, OH (US); Caleb Lusk, St. Paris, OH (US); Matthew Keller, Urbana, OH (US)

(*) Notice: Subject to any disclaimer, the term of this patent is extended or adjusted under 35 U.S.C. 154(b) by 0 days.

(21) Appl. No.: 15/142,166

(22) Filed: Apr. 29, 2016

Related U.S. Application Data

(60) Provisional application No. 62/155,569, filed on May 1, 2015.

(51) Int. Cl.
| | | |
|---|---|---|
| G08B 21/00 | (2006.01) | |
| G01C 9/32 | (2006.01) | |
| G01C 9/34 | (2006.01) | |
| G08B 5/36 | (2006.01) | |

(52) U.S. Cl.
CPC .............. *G01C 9/32* (2013.01); *G01C 9/34* (2013.01); *G08B 5/36* (2013.01)

(58) Field of Classification Search
None
See application file for complete search history.

(56) References Cited

U.S. PATENT DOCUMENTS

| | | | |
|---|---|---|---|
| 4,189,726 A | | 2/1980 | Rosa et al. |
| 5,847,820 A | * | 12/1998 | Hamar ................ G01B 11/26 356/139.1 |
| 6,455,790 B1 | | 9/2002 | Ogden |
| 7,069,662 B2 | | 7/2006 | Fung et al. |
| 7,161,138 B2 | | 1/2007 | Hsu |
| 7,950,162 B2 | * | 5/2011 | Horio .................. C25D 5/022 33/366.23 |
| 8,089,621 B2 | | 1/2012 | Horio |
| 2004/0138859 A1 | * | 7/2004 | Green ................ G01S 5/0294 702/190 |
| 2016/0262698 A1 | * | 9/2016 | Mahlin ............... A61B 5/6851 |

* cited by examiner

*Primary Examiner* — Adolf Dsouza
(74) *Attorney, Agent, or Firm* — Mark A. Navarre

(57) ABSTRACT

A gravity-based angle sensor apparatus includes an outer housing (which may be incorporated into a carpenter's level or other reference frame) that contacts or is fastened to a workpiece, and a sensor assembly rotatably mounted within the outer housing. The sensor assembly includes a frame having internal cavities for supporting a LED light module and a sensor responsive to the orientation of the sensor assembly. The sensor electrically bridges two terminals of the LED light module to activate an LED indicator lamp when the sensor assembly has a reference horizontal orientation.

11 Claims, 5 Drawing Sheets

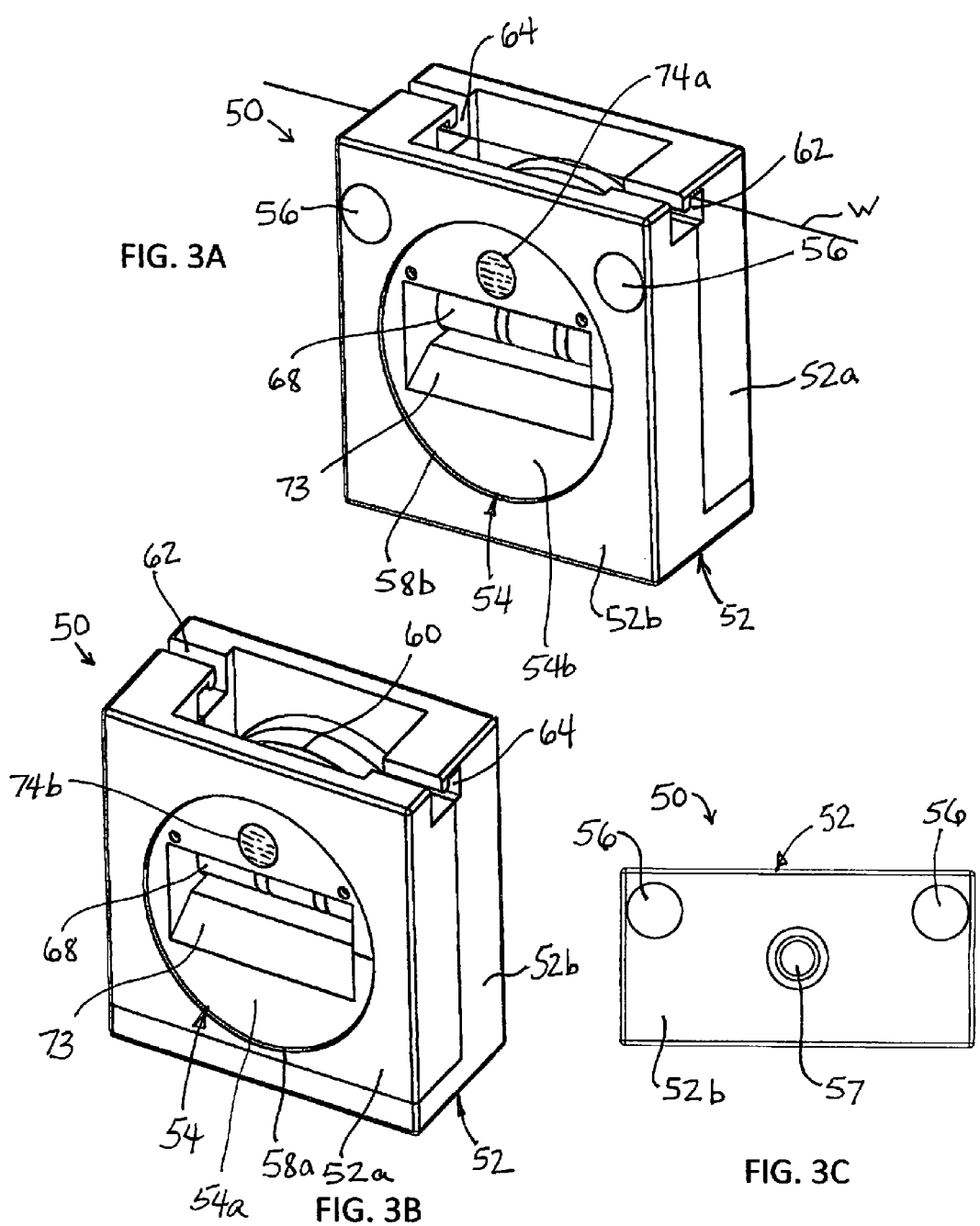

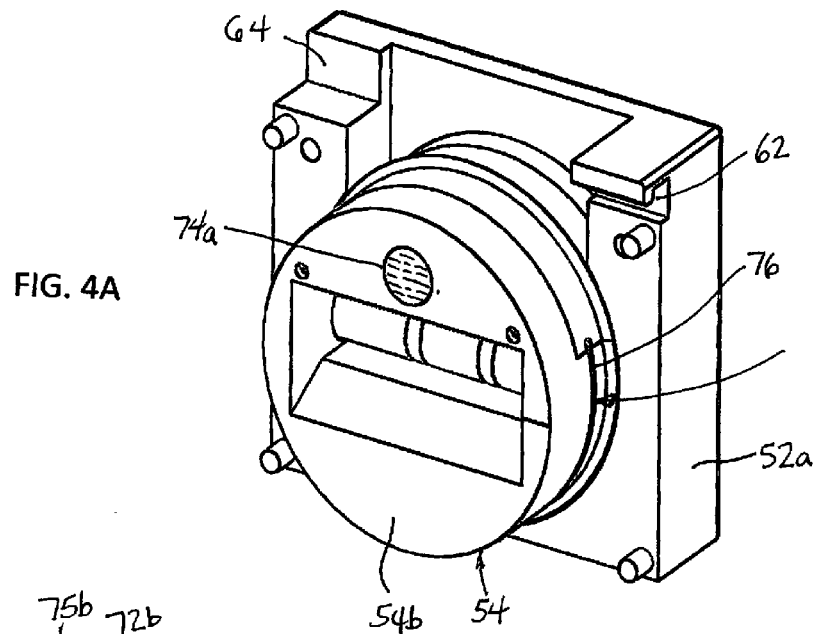
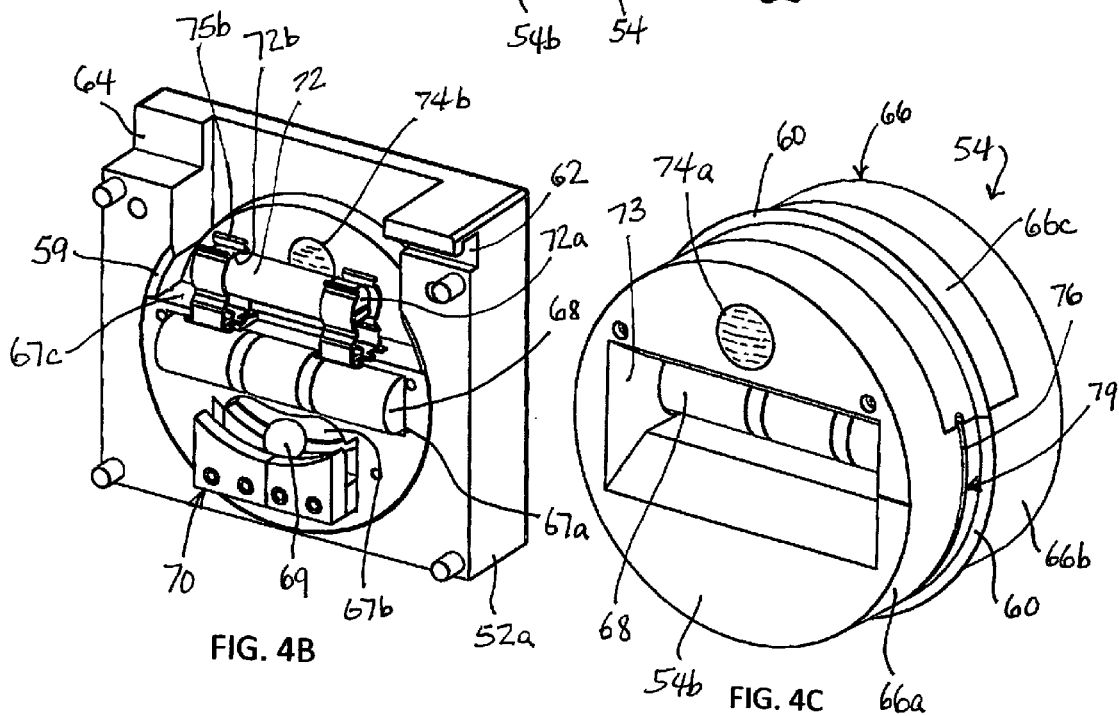

GRAVITY-BASED ANGLE SENSOR WITH LED INDICATOR

RELATED APPLICATIONS

This application claims priority based on the Provisional Patent Application No. 62/155,569, filed May 1, 2015.

TECHNICAL FIELD

The present invention relates to a gravity-based angle sensor apparatus with an LED lamp that is activated to indicate when a workpiece associated with the apparatus has a user-specified angular orientation with respect to a horizontal plane.

BACKGROUND OF THE INVENTION

There are many uses for level sensing, particularly in the construction and power tool fields. For example, carpenter routinely uses a bubble level in rough and finish carpentry, and power tools such as drills frequently incorporate a bubble level to help the user maintain a true horizontal or vertical orientation of the tool.

Electric indicators have also been used, such as in the U.S. Pat. No. 4,189,726 to Rosa et al., which discloses an electric drill with an integral gravity-actuated electric switch including a spherical steel ball that travels in a circular path and bridges pairs of electrical terminals to complete an electrical circuit through an indicator lamp when the drill is oriented in true horizontal or vertical directions. And this approach may be extended, as disclosed in the U.S. Pat. No. 6,455,790 to Ogden for example, to create an angular orientation sensor with multiple sets of contacts distributed along a curved two-dimensional or three-dimensional path. However, what is frequently needed in the construction field is a sensor that indicates when a workpiece such as a framing board, metal conduit or construction guide is oriented at a user-specified angle with respect to true horizontal.

SUMMARY OF THE INVENTION

The present invention provides an improved gravity-based angle sensor apparatus, including an LED indicator lamp that is activated to visually indicate when a workpiece associated with the apparatus has a user-specified angular orientation with respect to a horizontal plane. The apparatus includes an outer housing (which may be incorporated into a carpenter's level or other reference frame) that contacts or is fastened to the workpiece, and a sensor assembly rotatably mounted within the outer housing. The sensor assembly includes a frame having internal cavities for supporting a LED light module and a sensor responsive to the orientation of the sensor assembly. The sensor electrically bridges two terminals of the LED light module to activate the LED indicator lamp when the sensor assembly has a reference horizontal orientation. The face of the outer housing is provided with an arcuate angle scale, and the frame of the sensor assembly has a pointer that registers with the arcuate angle scale to indicate an angle of the workpiece to be sensed.

In use, the worker rotates the sensor assembly with respect to the outer housing, aligning the pointer with a desired angle on the angle scale, places or fastens the outer housing on the workpiece, and manually adjusts the angle of the workpiece until the sensor assembly emits a light signal; at such point, the workpiece is oriented at the desired angle with respect to the horizontal plane.

BRIEF DESCRIPTION OF THE DRAWINGS

FIGS. 3A, 3B and 3C depict a gravity-based angle sensor apparatus according to a second embodiment of the present invention, the sensor apparatus including a sensor assembly mounted in an outer housing. FIGS. 3A and 3B are front and rear isometric views of the sensor apparatus, and FIG. 3C is a bottom plan view of the sensor apparatus.

FIGS. 4A-4E are front isometric views of the sensor apparatus of FIG. 3A with various housing parts removed. In FIG. 4A, a front portion of an outer housing is removed; in FIG. 4B, a front portion and maintenance hatch of the sensor assembly are additionally removed; in FIG. 4C, the complete sensor assembly is depicted by itself; in FIG. 4D, the front portion of the sensor assembly is additionally removed; and in FIG. 4E, the maintenance hatch is additionally removed.

DESCRIPTION OF THE PREFERRED EMBODIMENT

In general, the present invention is directed to an improved gravity-based angle sensor apparatus that can be used with a workpiece such as a framing board, a metal conduit, a drainage pipe, etc. to visually indicate when the workpiece has a user-specified angular orientation with respect to a horizontal plane. And in some cases, the workpiece can be a construction expedient such as a tightly stretched string or wire used as a visual guide for construction work, for example, for achieving a desired slope for a concrete slab; in such an application, the sensor apparatus can be suspended from the workpiece instead of resting on it or clamped to it.

Figure 1:
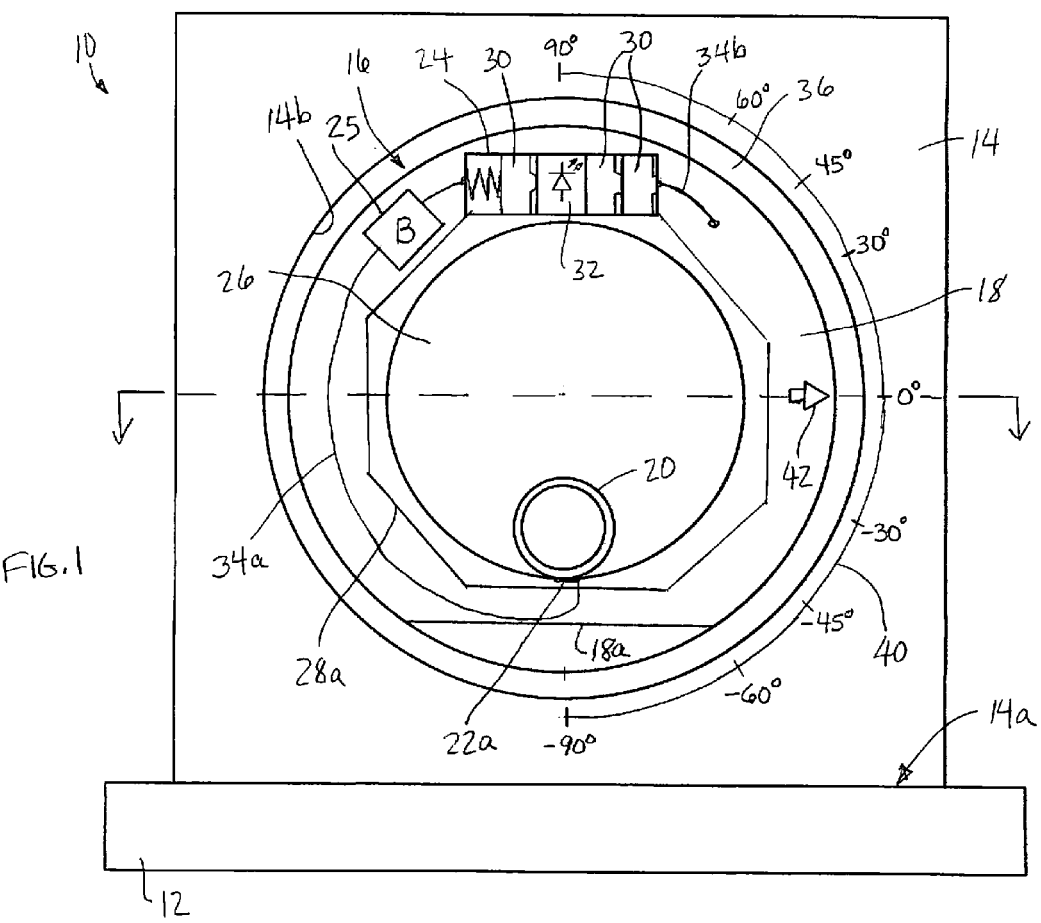
FIG. 1 is a side view of a gravity-based angle sensor apparatus according to a first embodiment of the present invention.
Figure 2:
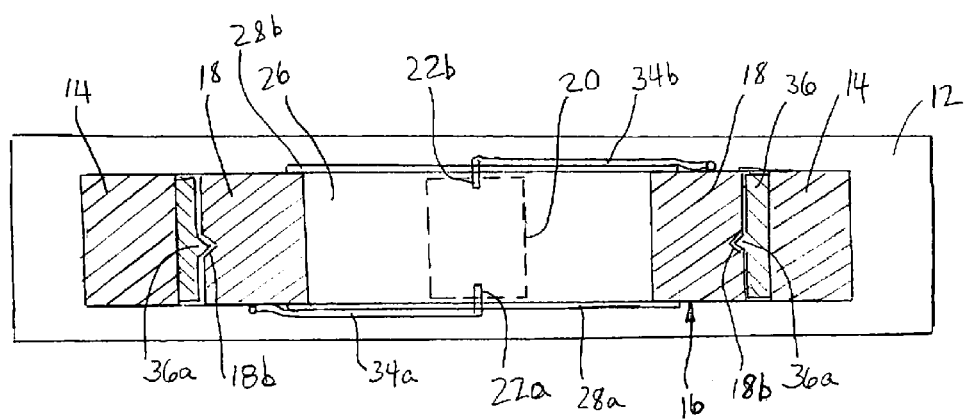
FIG. 2 is a cross-sectional view of the sensor apparatus of FIG. 1, taken along lines 2-2 in FIG. 1.

FIGS. 1-2 depict a sensor apparatus 10 according to the first embodiment of the invention, and FIGS. 3A-3C, 4A-4E and 5A-5B depict a sensor apparatus 10' according to the second embodiment of the invention. In FIGS. 1-2, the workpiece is designated by the reference numeral 12.

Referring to FIGS. 1-2, the sensor apparatus 10 according to the first embodiment includes an outer housing 14 and a sensor assembly 16 rotatably mounted within the outer housing 14. The outer housing has a base 14a that contacts or is fastened to the workpiece 12, and cylindrical opening 14b in which the sensor assembly 16 is disposed. The outer housing 14 can be a discrete member as illustrated in FIGS. 1-2, or may be integrated into a carpenter's level, or some other reference frame.

The sensor assembly 16 includes a frame 18, a movable electrically conductive element in the form of a metal tube 20, a pair of fixed conductive members 22a, 22b that function as electrical contacts, and a LED light module 24. The frame 18 has the shape of a modified ring—specifically, a ring with a flat peripheral surface 18a for defining a reference spatial orientation of the frame 18. The cylindrical volume enclosed by the frame 18 forms a cylindrical cavity 26, and the sides (axial ends) of the cavity 26 are closed by a pair of plates 28a, 28b fastened to the frame 18. The electrically conductive tube 20 is disposed within the closed cavity 26, and is axially constrained by the plates 28a, 28b, leaving it free to roll within the cavity 26 as the angular orientation of the frame 18 varies. As best seen in FIG. 2, the pair of conductive members 22a, 22b are disposed at the bottom of the cavity, on opposite axial sides thereof, with an axial gap there-between, such that the conductive tube 20 electrically bridges the conductive members 22a and 22b when the frame 18 has a reference horizontal orientation as illustrated in FIGS. 1-2.

The LED light module 24 is fastened to an axial face of the frame 18, preferably near the top of the frame 18 as illustrated, and includes a series combination of several (three in the illustrated embodiment) button-type batteries 30 and a LED cell 32 packaged in a single housing. The LED light module 24 is a two terminal device, one terminal being connected to the electrical contact 22a via conductor 34a, and the other terminal being connected to the electrical contact 22b via conductor 34b. When the conductive tube 20 is positioned to electrically bridge the contacts 22a and 22b, it completes a circuit through the LED light module 24 and activates the LED cell 32 to emit a signal light. Optionally, a buzzer (B) or chime module 25 can be electrically coupled in series with the LED module 24 in order to produce an audible sound when the LED module 24 is activated.

As mentioned above, the sensor assembly 16 is rotatably mounted within the outer housing 14; this allows a user to rotate the sensor assembly 16 with respect to the outer housing 14 to select a desired detection angle. Preferably, the sensor assembly 16 is removably mounted within the outer housing 14 so that it can be removed and used as a level detector apart from the outer housing 14. In that case, the user would place the sensor assembly 16 directly on the workpiece 12, with the flat peripheral surface 18a of frame 18 being in registration with the workpiece 12. The illustrated mechanism for rotatably and removably mounting the sensor assembly 16 within the cylindrical opening 14b of outer housing 14 is an interface 36 disposed between the two and fastened to the inner periphery of the cylindrical opening 14b. As best seen in FIG. 2, the interface 36 (which may be formed of a resilient natural or synthetic material) includes an inwardly depending ridge 36a that lodges in a complementary peripheral groove 18b in the sensor assembly frame 18. The ridge 36a and groove 18b axially retain the sensor assembly 16 within the outer housing's cylindrical opening 14b, while permitting a user to rotate the sensor assembly 16 with respect to the outer housing 14.

Referring to FIG. 1, an arcuate angle scale 40 on an axial face of outer housing 14 cooperates with a pointer 42 on an axial face of the sensor assembly frame 18 to provide a measure of the rotary orientation of the sensor assembly 16 with respect to the outer housing 14. The scale 40 and pointer 42 are placed such that the pointer 42 registers with the 0-degree mark on the scale 40 when the flat peripheral surface 18a of frame 18 is parallel with the base 14a of outer housing 14. If the pointer 42 is in registration with the 0-degree mark as illustrated, the conductive tube 20 will electrically bridge the conductive members 22a and 22b to activate the LED cell 32 when the workpiece 12 is oriented horizontally (i.e., level). In the illustrated embodiment, the scale 40 delineates angles of rotation ranging from +90 degrees to 90 degrees, relative to the aforementioned 0 degree mark. If, for example, the sensor assembly 16 is rotated within the outer housing 14 to align the pointer 42 with +45 degrees on the scale 40, the conductive tube 20 will electrically bridge the conductive members 22a and 22b to activate the LED cell 32 when the workpiece 12 is inclined at an angle of 45 degrees relative to a horizontal plane—that is, when the workpiece 12 is rotated 45 degrees clockwise from the illustrated horizontal orientation. Thus, a user of the angle sensor apparatus may select any desired angle of inclination to measure. Alternately, of course, the scale 40 may subtend the entire 360 degrees of rotation (that is, +180 degrees to −180 degrees) relative to the aforementioned 0 degree mark. And of course, the locations of the scale 40 and pointer 42 can be reversed.

Referring now to FIGS. 3A-3C, a sensor apparatus according to the second embodiment of this invention is generally designated by the reference numeral 50. For simplicity, the scale 40 and pointer 42 of the first embodiment have been omitted in the depictions of the second embodiment. But similar to the sensor apparatus of the first embodiment, the sensor apparatus 50 includes an outer housing 52 and a cylindrical sensor assembly 54 rotatably mounted within the outer housing 52. The outer housing 52 is an assembly of two sections 52a, 52b joined by a set of hidden fasteners. In the illustrated embodiment, the head of each fastener is covered by a disk-shaped permanent magnet 56; two such magnets are disposed on one side of the housing section 52b, as depicted in FIG. 3A, and two other such magnets 56 are disposed on the bottom of the housing section 52b, as depicted in FIG. 3C. The magnets 56 serve not only to hide the fasteners, but also to mount the sensor apparatus 50 on a ferrous workpiece without additional mounting hardware. As also seen in FIG. 3C, the bottom surface of housing section 52b includes a threaded opening 57 such as is typically provided on the base of a camera for mechanically mounting the sensor apparatus 50 on a workpiece provided with a threaded mounting stud.

The housing sections 52a and 52b have central openings 58a, 58b that are axially aligned to define a cylindrical cavity in which the cylindrical sensor assembly 54 is received, leaving exposed to view the front and rear axial faces 54a, 54b of the sensor assembly 54. The mating surfaces of the openings 58a, 58b are chamfered (as designated by the reference numeral 59 in FIG. 4B) to define an internal peripheral groove in the cylindrical cavity, and the radial periphery of the sensor assembly 54 has a complementary outwardly depending ridge 60 that seats in the outer housing's peripheral groove to axially retain the sensor assembly 54 within the outer housing's cylindrical cavity, while permitting a user to rotate the sensor assembly 54 with respect to the outer housing 52. The upper surfaces of the outer housing sections 52a, 52b are oppositely slotted as designated by the reference numerals 62 and 64 to receive a tightly stretched string or wire W (as illustrated in FIG. 3A) used as a visual guide for construction work, allowing the sensor apparatus 50 to be conveniently suspended from the string or wire.

Figure 4D:
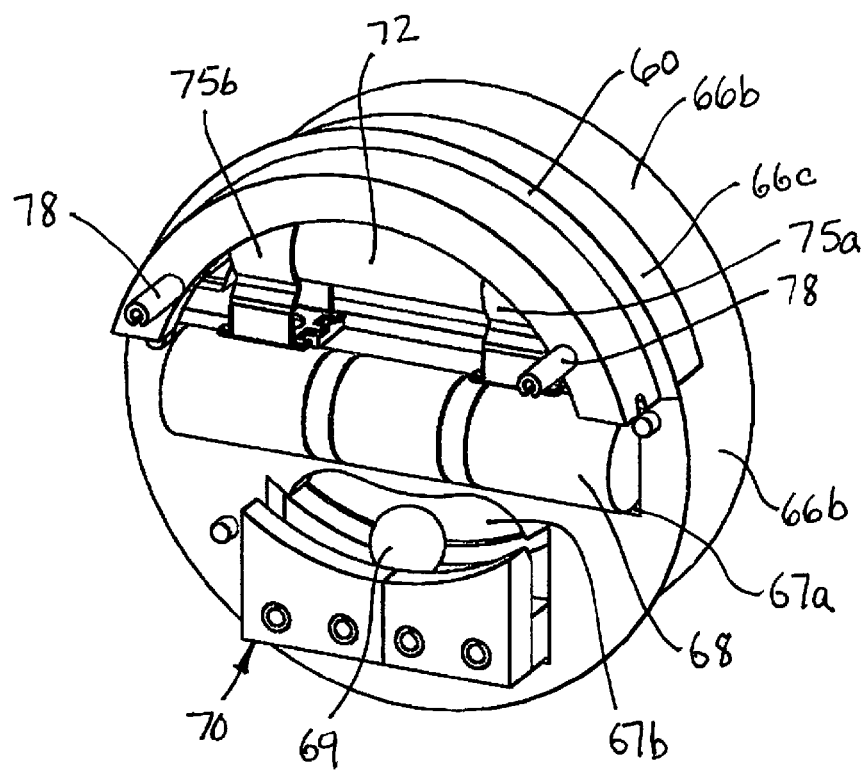

Referring now primarily to FIGS. 4A-4E, the sensor assembly 54 includes a three-part frame 66 in which are mounted a bubble level 68, a ball 69 and track 70, and a LED light module 72. The frame 66 includes front and back halves 66a, 66b that define a first internal compartment 67a for accommodating the bubble level 68, a window 73 for viewing the bubble level 68, a second internal compartment 67b for the ball 69 and track 70, and a third internal compartment 67c for the LED light module 72. Additionally, cylindrical light pipe elements 74a, 74b are mounted in each of the frame halves 66a, 66b for emitting light produced by the LED light module 72. The third part of the frame 66 is an arcuate maintenance hatch 66c that can be removed for access to the second internal compartment 67c that houses LED light module 72. A set of pins 78, two of which are shown in FIG. 4D, mutually secure the three parts 66a-66c of the frame 66.

The LED light module 72 is functionally like the LED light module 24 of FIG. 1, but is conveniently packaged with the form factor of a standard glass tube fuse with metal end caps 72a, 72b. The metal end caps 72a, 72b are electrically coupled to the opposing battery terminals of the LED light module 72, and a set of fuse holders 75a, 75b mounted in the internal compartment 67c both retain the LED light module 72 and electrically couple it to a pair of wires 76, one of which is depicted in FIG. 4B. The wires 76 are routed to the conductive track 70 via grooves 79 formed in the exterior periphery of the front half 66a of frame 66. And as illustrated, the cylindrical light pipe elements 74a, 74b are each aligned with the center of the LED light module 72 where the LED cell 32 is located. The glass fuse form factor of LED light module 72 and its retainment with the fuse holders 75a, 75b also allows the LED light module 72 to be removed and replaced as easily as replacing a typical fuse element. And the arcuate maintenance hatch 66c is removable to facilitate such removal and replacement.

Figure 4E:
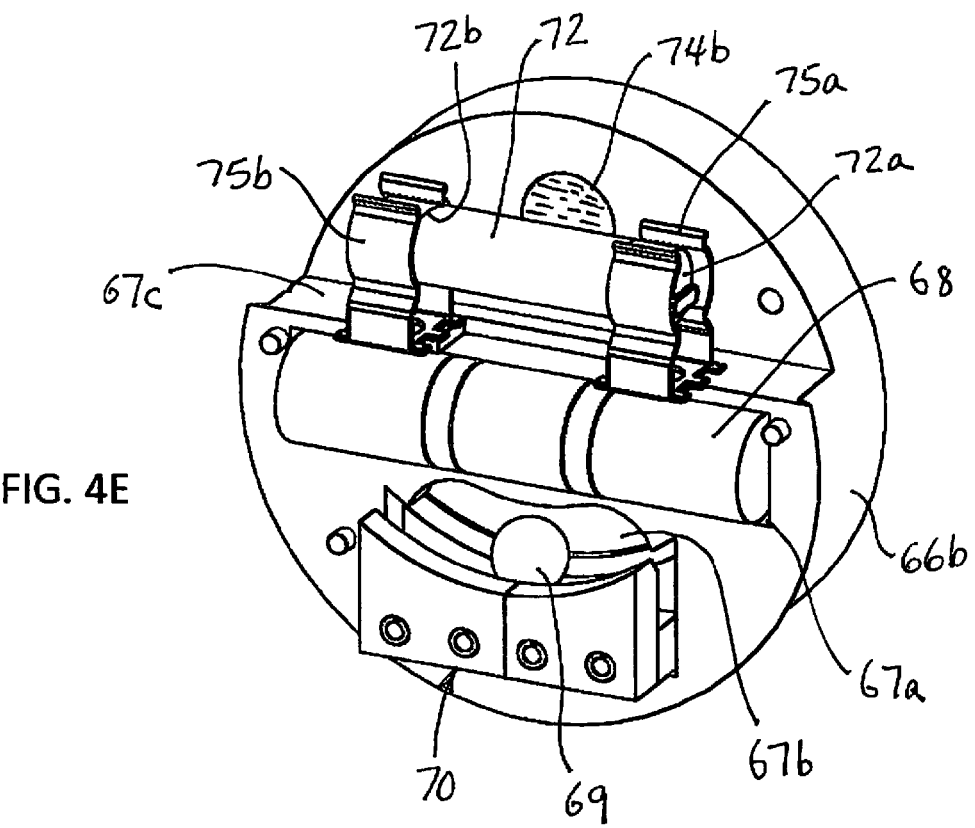

As best seen in FIGS. 4B and 4D-4E, the conductive ball 69 and conductive track 70 are housed within the internal compartment 67b of sensor assembly frame 66 in a way that captures the ball 69, but leaves it free to roll on the track 70. The ball 69 is conductive, as are certain portions of the track 70 so that the ball electrically bridges a pair of conductive portions of the track 70 when the track 70, and hence the sensor assembly 54 is level. The ball 69 and conductive portions of the track 70 are preferably constructed of brass, so as to be highly conductive but non-ferrous so that the permanent magnets 56 and other nearby magnetic fields will not influence the operation of the sensor apparatus 50.

Figure 5A:
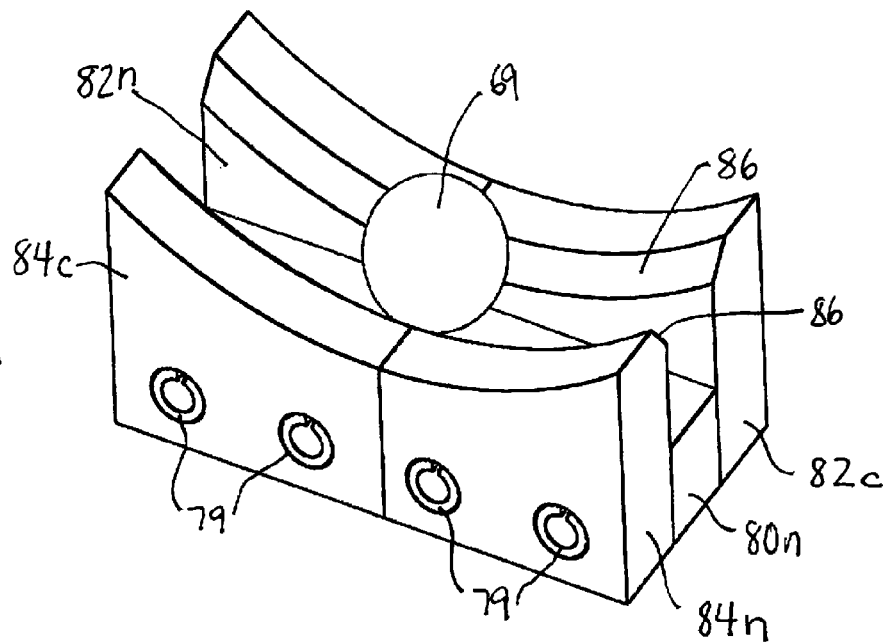
FIGS. 5A-5B depict a gravity-based sensor mounted within the sensor apparatus of FIGS. 3-4.
Figure 5B:
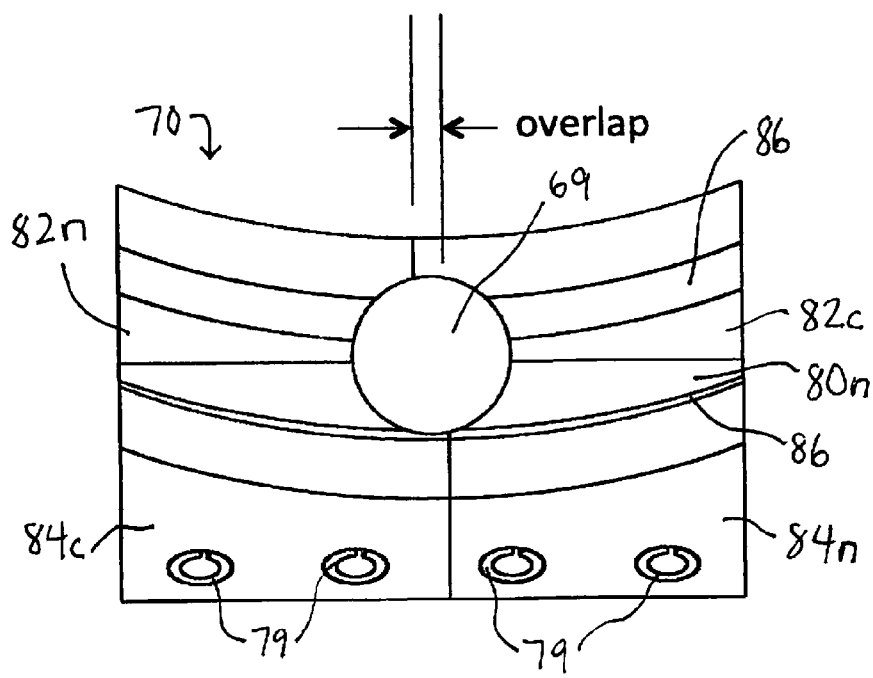

The track 70, best seen in FIGS. 5A-5B, is an assembly of five members mutually secured by the pins 79. These elements include a non-conductive base 80n, two non-conductive side rails 82n, 84n, and two conductive side rails 82c, 84c. The upper surfaces of the side rail members 82c, 82n, 84c, 84n are curved and chamfered on their interior faces as designated by the reference numeral 86 to form a concave track in which the ball 79 rolls under the influence of gravity. The conductive side rails 82c, 84c are mutually offset as shown, but are slightly longer than the non-conductive side rails 82n, 84n so that the conductive side rails 82c, 84c axially overlap by a small amount such as 1 mm, as indicated in FIG. 5B. The conductive ball 69 is spherical, having a diameter of approximately 4 mm, and it bridges the overlapped portions of the conductive side rails 82c, 84c when it is in registry with the overlap. Since the overlap occupies only a very small range of rotation of the sensor assembly 54, a fine degree of angle detection resolution is ensured.

It will be understood in view of the above that both embodiments of the sensor apparatus operate in essentially the same manner, and that the features of one embodiment are generally applicable to the other embodiment as well. For example, the conductive track configuration of the second embodiment can be adapted for use in the first embodiment. And for that matter, the conductive ball and track arrangement can be replaced with a mechanical or electronic tilt switch that closes to activate the LED lamp module 72 when the sensor assembly 54 is level, but is otherwise open. Of course, numerous such modifications and variations will occur to those skilled in the art, and it is intended that the invention not be limited to the disclosed embodiments, but that it have the full scope permitted by the language of the following claims.

The invention claimed is:

1. A gravity-based angle sensor apparatus for a workpiece, the sensor apparatus comprising:
   an outer housing joined or fastened to the workpiece;
   a sensor assembly rotatable within the outer housing to select a desired angular orientation of the workpiece, the sensor assembly including a LED light module that emits LED light when first and second terminals thereof are electrically bridged, and a sensor responsive to an angular orientation of the sensor assembly that electrically bridges the first and second terminals of said LED light module when the sensor assembly has a reference horizontal orientation, where said sensor assembly includes an internal compartment that houses said sensor, said sensor including a movable conductive element that rolls within said compartment under the influence of gravity, and a pair of fixed conductive members that are electrically bridged by said conductive element when the sensor assembly has said reference horizontal orientation; and
   scale indicia on the sensor assembly and the outer housing to indicate the desired angular orientation of the workpiece.

2. The gravity-based angle sensor apparatus of claim 1, where said conductive element is tubular or spherical.

3. The gravity-based angle sensor apparatus of claim 1, where:
   said sensor includes a set of non-conductive members that, with said pair of conductive members, form a curved track on which said movable conductive element rolls.

4. The gravity-based angle sensor apparatus of claim 3, where said pair of conductive members are mutually offset but slightly overlap in an axial direction so that said conductive element electrically bridges said pair of conductive members when it is in registry with said overlap.

5. A gravity-based angle sensor apparatus for a workpiece, the sensor apparatus comprising:
   an outer housing joined or fastened to the workpiece;
   a sensor assembly rotatable within the outer housing to select a desired angular orientation of the workpiece, the sensor assembly including a LED light module that emits LED light when first and second terminals thereof are electrically bridged, and a sensor responsive to an angular orientation of the sensor assembly that electrically bridges the first and second terminals of said LED light module when the sensor assembly has a reference horizontal orientation;
   a buzzer element coupled in series with said LED light module for emitting an audible sound when said sensor electrically bridges the first and second terminals of said LED light module; and
   scale indicia on the sensor assembly and the outer housing to indicate the desired angular orientation of the workpiece.

6. The gravity-based angle sensor apparatus of claim 5, where said outer housing includes an upper face that is slotted to receive a tightly stretched string or wire for suspending said sensor apparatus from said string or wire.

7. A gravity-based angle sensor apparatus for a workpiece, the sensor apparatus comprising:
   an outer housing joined or fastened to the workpiece;
   a sensor assembly rotatable within the outer housing to select a desired angular orientation of the workpiece, the sensor assembly including a LED light module that emits LED light when first and second terminals thereof are electrically bridged, and a sensor responsive to an angular orientation of the sensor assembly that electrically bridges the first and second terminals of said LED light module when the sensor assembly has a reference horizontal orientation, where said sensor assembly is cylindrical, with front and rear axial faces, and said outer housing includes first and second housing sections featuring cylindrical openings, with said outer housings being joined to axially retain said sensor assembly, while exposing front and rear axial faces of said sensor assembly; and scale indicia on the sensor assembly and the outer housing to indicate the desired angular orientation of the workpiece.

8. The gravity-based angle sensor apparatus of claim 7, where:
   said outer housing incorporates permanent magnets for magnetic attachment of said sensor apparatus to a ferrous workpiece; and
   said sensor is non-ferrous and therefore unaffected by magnetic fields.

9. The gravity-based angle sensor apparatus of claim 7, including light pipe elements in the front and rear axial faces of said sensor assembly for transmitting light emitted by said LED light module.

10. The gravity-based angle sensor apparatus of claim 7, where:
   said sensor assembly additionally houses a bubble level; and
   the front and rear axial faces of said sensor assembly include windows through which said bubble level is viewable.

11. The gravity-based angle sensor apparatus of claim 7, where:
   said sensor assembly includes first, second and third frame members that are joined to house said LED light module and said sensor;
   said LED light module is removably retained in a holder assembly; and
   said third frame member is removable to access said LED light module and said holder assembly.

* * * * *